March 15, 1949. W. A. SCHULZE ET AL 2,464,723
PREPARATION OF UNSATURATED NITRILES
Filed Nov. 16, 1944
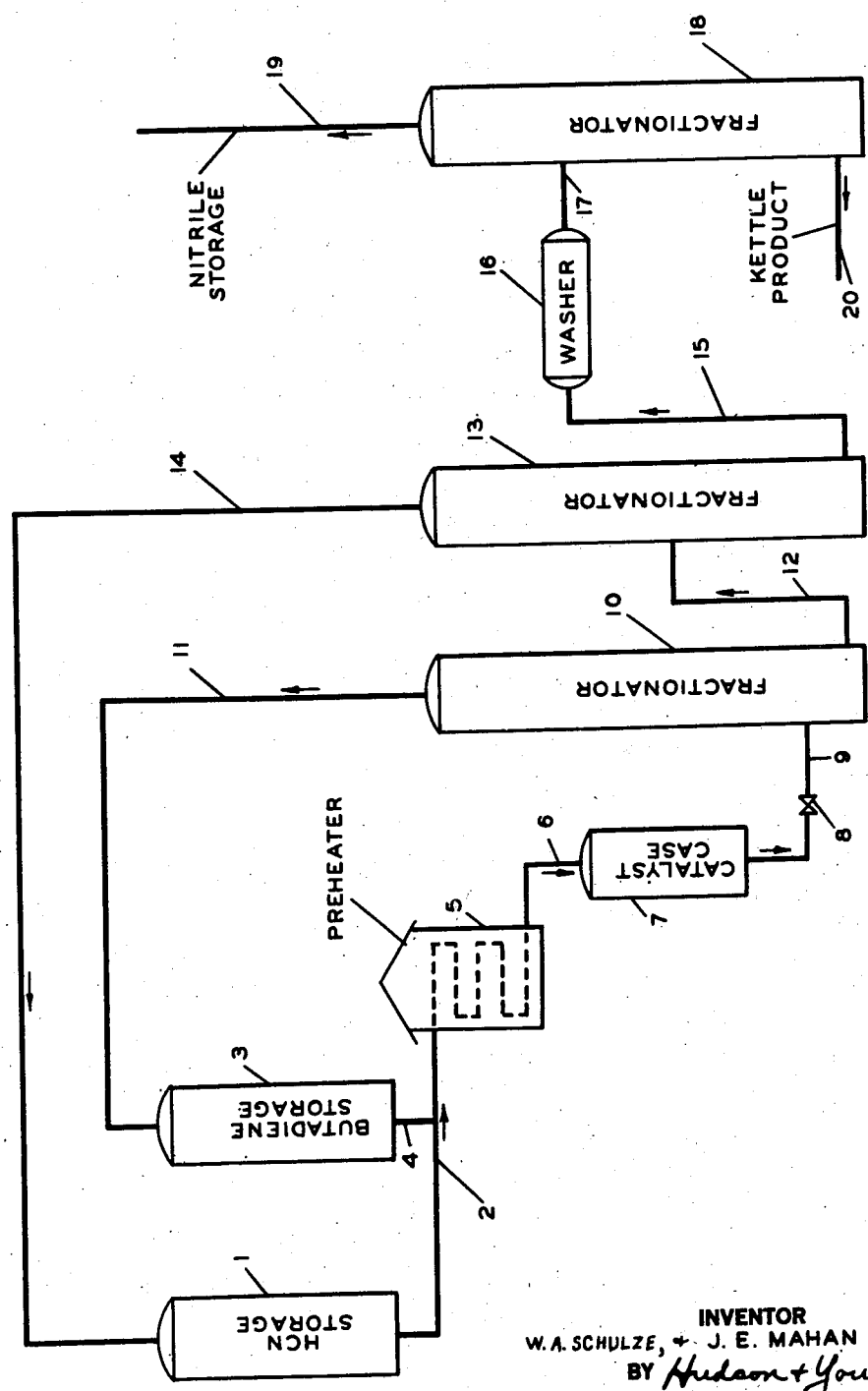
INVENTOR
W. A. SCHULZE, + J. E. MAHAN
BY Hudson + Young
ATTORNEYS Patented Mar. 15, 1949

2,464,723

UNITED STATES PATENT OFFICE 2,464,723

PREPARATION OF UNSATURATED NITRILES

Walter A. Schulze and John E. Mahan, Bartlesville, Okla., assignors to Phillips Petroleum Company, a corporation of Delaware Application November 16, 1944, Serial No. 563,744

3 Claims. (Cl. 260—465.3)

This invention relates to the production of organic cyanides or nitriles of unsaturated carboxylic acids by the direct interaction of conjugated diolefins and hydrocyanic acid or hydrogen cyanide. More specifically, the present invention relates to the liquid-phase reaction between conjugated diolefins and hydrocyanic acid or hydrogen cyanide over a solid contact catalyst. Still more specifically, this invention relates to the liquid-phase addition of hydrocyanic acid or hydrogen cyanide to conjugated diolefins in the presence of a solid cuprous chloride catalyst to yield unsaturated nitriles or alkenenitriles, both aliphatic and alicyclic.

The value of cyanides or nitriles as intermediates in organic synthesis has long been recognized. A wide variety of products, such as acids, aldehydes, ketones, amines and the like, can be derived from such intermediates. Unsaturated nitriles undergo analogous reactions, thus giving rise to unsaturated analogs. Furthermore, in many instances, saturated compounds can be prepared by simple hydrogenation of the end-products of reaction. More recently, unsaturated nitriles have been in demand as co-monomers for use in the synthetic-rubber and synthetic-resin industries.

In general, the synthesis of unsaturated nitriles heretofore has been possible only through expensive and, for the most part, inefficient reactions. The most commonly employed synthesis involves the interaction of an alkenyl halide with a metallic cyanide. This reaction fails, however, when a double bond is present in the position alpha to the cyanide group. Other operative methods for preparing alkenyl nitriles may be deduced from classical reactions used in preparing saturated nitriles such as, for example, the dehydration of unsaturated amides. Thus, certain unsaturated nitriles containing 4 or more carbon atoms in the alkenyl residue have been prepared by treating the corresponding acid with ammonia over a quartz catalyst at about 935° F. It can be seen, however, that such methods of synthesis have well defined limitations imposed by the availability of the starting materials.

An object of this invention is to provide a process for the preparation of unsaturated nitriles.

Another object is to provide a process for the preparation of aliphatic and alicyclic unsaturated nitriles by reaction of hydrogen cyanide with the corresponding conjugated diolefin.

Still another object is to provide a process in which the reaction between hydrogen cyanide and the conjugated diolefin is carried out in liquid phase in the presence of a solid cuprous chloride catalyst.

Other objects of the invention, some of which are referred to hereinafter, will be apparent to those skilled in the art to which the invention pertains.

We have now discovered that the direct interaction of hydrogen cyanide and conjugated diolefins can be effected in the liquid phase in the presence of a solid cuprous chloride catalyst. This reaction as it occurs with the simplest conjugated diolefin is illustrated by the following equation:

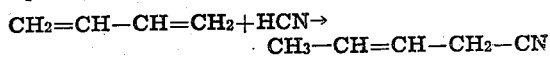

$$CH_2=CH-CH=CH_2+HCN \rightarrow CH_3-CH=CH-CH_2-CN$$

The equation depicts 1,4 addition of hydrogen cyanide to butadiene; it is not intended, however, that the reaction should be limited to this mechanism, since in some instances, depending on the nature of the diolefin and reaction conditions, the addition of hydrogen cyanide may follow a different course.

The synthesis of unsaturated nitriles according to the present invention is conveniently carried out by passing a mixture of hydrogen cyanide and the conjugated diolefin substantially in the liquid phase and with or without an inert diluent over a porous and substantially anhydrous cuprous chloride catalyst. A specific embodiment of the present process is illustrated in the accompanying simplified flow diagram in which butadiene is employed as the conjugated diolefin feed. Liquid hydrogen cyanide from storage tank 1 is mixed in line 2 with such proportions of butadiene from tank 3 and line 4 as to result in a molal excess of one of the reactants. The butadiene-hydrogen cyanide mixture is heated in preheater 5 and conducted in substantially liquid or mixed phase through line 6 to the catalyst case 7 which is maintained by heating if necessary at a temperature within the neighborhood of 100 to 400° F. In most cases as a result of exothermic heat of the reaction, it will only be necessary to apply enough external heat to the reaction vessel to bring the chamber up to the desired initial temperature condition and then discontinue heating since the exothermic heat will suffice to complete the reaction. The pressure on the reaction vessel is suitably maintained at about 200 to 700 pounds per square inch gauge in order to maintain the reaction mixture in a substantially liquid phase.

The catalyst chamber effluent passes through valve 8 or other suitable means of effecting the desired reduction in pressure and via line 9 to the fractionator 10. Unreacted butadiene is taken overhead from fractionator 10 via line 11 to the butadiene storage tank 3 while the kettle product is transferred via line 12 to fractionator 13. Substantially pure hydrogen cyanide is removed via line 14 to storage tank 1. The kettle product from fractionator 13 containing traces of hydrogen cyanide is conducted through line 15 through the caustic washer 16 and thence through line 17 to fractionator 18. The overhead product comprises substantially pure pentene nitrile and is taken to storage via line 19. The kettle product which consists mainly of polymeric material is withdrawn through line 20.

Conjugated diolefins for use in the process of the present invention may be obtained from any suitable source and include both aliphatic and alicyclic diolefins. The conjugated diolefins which may be used include 1,3-butadiene, 1,3-cyclopentadiene, 1,3-cyclohexadiene, and their respective homologs. Piperylene (1,3-pentadiene) and isoprene (2-methyl-1,3-butadiene) are particularly useful homologs of butadiene as starting materials in the process of our invention.

The catalyst for use in the process of this invention comprises substantially anhydrous cuprous chloride. The catalyst may be prepared as pellets of cuprous chloride with an inert binder or the catalyst may be applied on an adsorbent or non-adsorbent carrier. One method of catalyst preparation which is especially applicable in commercial units comprises the impregnation of an adsorbent carrier such as activated charcoal, bauxite, fuller's earth and the like with a solution of cupric chloride and then reducing the cupric chloride to the cuprous state with selective agents such as gaseous sulfur dioxide and solutions of sulfites, bisulfites, thiosulfates and mercaptans. The catalyst is then dehydrated with a non-oxidizing gas such as nitrogen or gaseous hydrocarbons. The preparation of such adsorbent catalysts can be carried out in the catalyst case to provide a catalytic material substantially free of non-active cupric salts.

Under liquid-phase conditions at suitable pressures the cuprous chloride catalyst promotes nitrile formation at temperatures ranging from about 100° F. to about 600° F. with the intermediate range of 150° to 350° F. being ordinarily preferred. Operating pressures at the above temperatures do not usually exceed 700 pounds per square inch gauge. The operating pressure generally is above 100 pounds per square inch gauge and preferably within the range of 500 to 650 pounds per square inch gauge.

The time of contact between catalyst and reactants is subject to rather wide variation and is dependent on the temperature, activity of the catalyst and the nature of the conjugated diolefin. Ordinarily a reaction time of about 10 to 30 minutes is ample although in special cases involving low reaction temperatures longer time of contact may be necessary. In actual operation of the process this variable is regulated by frequent analysis for hydrogen cyanide which is used as a convenient index of the extent of conversion.

In the operation of the present process advantage is taken of the mass action law by charging one of the reactants in a molal excess over the other. Wherever possible an excess of the diolefin is used in order to insure maximum conversion of hydrogen cyanide. However, in the case of cyclopentadiene and its homologs it is usually preferable to have an excess of hydrogen cyanide. It is also often advantageous to employ an inert diluent such as ether, acetonitrile, certain hydrocarbons and various other suitable materials to reduce excessive diolefin polymerization and for the general control of the exothermic reaction.

In our copending patent application, Ser. No. 534,162, filed May 4, 1944, now Patent 2,447,600, granted August 24, 1948, we disclosed a process for the preparation of unsaturated nitriles by the reaction of a diolefin with hydrogen cyanide in vapor phase in the presence of a cuprous chloride catalyst. In another copending patent application, Ser. No. 534,161, filed May 4, 1944, now Patent 2,422,859, granted June 24, 1947, we disclosed a process for the preparation of unsaturated nitriles by the reaction of a diolefin with hydrogen cyanide in the presence of an aqueous solution of a cuprous salt as catalyst.

The following examples further illustrate the process of our invention. These examples are illustrative only and are not to be construed as limiting our invention in any way.

*Example I*

A liquid mixture of butadiene and hydrogen cyanide in the proportion of 2 moles of hydrogen cyanide to 2.5 moles of butadiene was passed through a preheater and thence to a reaction chamber containing a catalyst prepared by depositing cuprous chloride on pumice. A flow rate of 1.4 liquid volumes of the reaction mixture per volume of catalyst per hour was maintained to the reactor. The pressure in the catalyst chamber was maintained at about 500–600 pounds per square inch gauge. The effluent from the catalyst case was discharged at atmospheric pressure by means of a needle valve into a condensing system. The unreacted butadiene and part of the hydrogen cyanide was separated from the reaction mixture by condensation of the pentene nitrile which was then treated with dilute sodium hydroxide and dried to remove the remainder of the hydrogen cyanide. Upon fractionation, a 20 per cent yield of trans-3-pentene nitrile based on hydrogen cyanide charged was obtained which boiled at 287.6–296.6° F. (142–147° C.) and had a refractive index, $n_D^{20}$, of 1.4232.

*Example II*

A blend of hydrogen cyanide and butadiene in a mol ratio of 1:2 was prepared and diluted with 10 parts by weight of acetonitrile to prepare the feed stock for the reaction. The catalyst was prepared by spraying a solution of cupric chloride on fuller's earth and subsequently reducing the copper to the cuprous state with sulfur dioxide. The catalyst was dried at 400° F. in a stream of nitrogen for 8 hours. The blend of reactants in acetonitrile under a pressure of 550 to 600 pounds per square inch gauge was charged to the catelyst case at a temperature of 275° F. at a flow rate of 2.5 volumes of feed per volume of catalyst per hour. The product stream was processed as in Example I to give a yield of pentene nitrile equivalent to 36 per cent of theory based on hydrogen cyanide charged.

We claim:

1. An improved and continuous process for the production of a pentene nitrile by the interreaction of 1,3-butadiene and hydrogen cyanide, which comprises continuously passing a liquid stream containing 1,3-butadiene and hydrogen cyanide in a mol ratio between 2:1 and 1.25:1, inclusive, together with acetonitrile as a diluent into contact with a solid porous anhydrous cuprous chloride catalyst, prepared by spraying a solid, porous, inert granular support with an aqueous solution of cupric chloride, reducing said cupric chloride to cuprous chloride, and drying the resulting material, the conditions of contact of said stream with said catalyst comprising a temperature between 100 and 350° F., a pressure between 100 and 700 pounds per square inch and sufficient to maintain said stream in liquid phase, and a contact time between 10 and 30 minutes, and recovering from an effluent stream a pentene nitrile so produced.

2. An improved and continuous process for the production of an unsaturated nitrile by the interreaction of a conjugated diolefin having not more than six carbon atoms per molecule and hydrogen cyanide, which comprises continuously passing a liquid stream containing such a conjugated diolefin and hydrogen cyanide in a mol ratio between 2:1 and 1.25:1, inclusive together with acetonitrile as a diluent into contact with a solid porous anhydrous cuprous chloride catalyst, prepared by spraying a solid, porous, inert granular support with an aqueous solution of cupric chloride, reducing said cupric chloride to cuprous chloride, and drying the resulting material, the conditions of contact of said stream with said catalyst comprising a temperature between 100 and 350° F., a pressure between 100 and 700 pounds per square inch and sufficient to maintain said stream in liquid phase, and a contact time between 10 and 30 minutes, and recovering from an effluent stream an unsaturated nitrile so produced.

3. An improved and continuous process for the production of an unsaturated nitrile by the interreaction of a conjugated diolefin and hydrogen cyanide, which comprises continuously passing a liquid stream containing a conjugated diolefin and hydrogen cyanide with a molar excess of conjugated diolefin together with acetonitrile as a diluent under anhydrous conditions into contact with a solid porous anhydrous cuprous chloride catalyst, prepared by incorporating an anhydrous cuprous chloride upon a solid porous inert granular support by spraying said support with an aqueous solution of cupric chloride, reducing said cupric chloride to cuprous chloride, and drying the resulting material, contacting said reactants with said catalyst at a temperature between 100 and 350° F., a pressure between 100 and 700 pounds per square inch and sufficient to maintain said stream in liquid phase, and a contact time between 10 and 30 minutes, and recovering from an effluent stream an unsaturated nitrile so produced.

WALTER A. SCHULZE.
JOHN E. MAHAN.

REFERENCES CITED

The following references are of record in the file of this patent:

UNITED STATES PATENTS

| Number | Name | Date |
| --- | --- | --- |
| 2,102,611 | Carothers et al. | Dec. 21, 1937 |
| 2,123,504 | Dykstra | July 12, 1938 |
| 2,322,696 | Kurtz et al. | June 22, 1943 |
| 2,385,741 | Teter | Sept. 25, 1945 |

OTHER REFERENCES

Kharasch et al., Jour. Org. Chem., vol. 2 pp. 489–496 (1937).

Berkman et al., "Catalysis," (Reinhold), pages 426, 482 (1940).